US009143364B2

(12) United States Patent
Mohammed et al.

(10) Patent No.: US 9,143,364 B2
(45) Date of Patent: Sep. 22, 2015

(54) IQ IMBALANCE ESTIMATION USING BROADCAST SIGNALS

(71) Applicant: Broadcom Corporation, Irvine, CA (US)

(72) Inventors: Ahmad Mohammed, Sunnyvale, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/050,922

(22) Filed: Oct. 10, 2013

(65) Prior Publication Data

US 2015/0103960 A1   Apr. 16, 2015

(51) Int. Cl.
*H04L 25/02* (2006.01)
*H04L 1/20* (2006.01)

(52) U.S. Cl.
CPC ............ *H04L 25/0204* (2013.01); *H04L 1/206* (2013.01)

(58) Field of Classification Search
CPC .............. H04L 27/0014; H04L 1/0045; H04L 2025/03414; H04L 25/03159; H04L 2025/03522; H04L 2027/0024; H04L 27/2647; H04L 27/2656; H04L 27/2657; H04L 27/2675; H04L 2025/03484; H04L 2025/03617; H04L 25/0204; H04L 1/206; H04L 27/3863; H04L 2027/0016; H04B 17/0012; H04B 17/0062; H04B 7/0413
See application file for complete search history.

(56) References Cited

U.S. PATENT DOCUMENTS

| 2003/0231726 | A1* | 12/2003 | Schuchert et al. | ............ 375/350 |
| 2006/0239339 | A1* | 10/2006 | Brown et al. | ............... 375/232 |
| 2007/0110020 | A1* | 5/2007 | Kroeger et al. | .............. 370/343 |
| 2008/0159442 | A1* | 7/2008 | Tanabe et al. | ................. 375/324 |
| 2008/0219386 | A1* | 9/2008 | Chrabieh et al. | ............. 375/343 |
| 2008/0279292 | A1* | 11/2008 | Tanabe et al. | ................. 375/260 |
| 2009/0092193 | A1* | 4/2009 | Fujita | ............................. 375/260 |
| 2009/0232108 | A1* | 9/2009 | Haghighat et al. | ............ 370/336 |
| 2009/0325516 | A1* | 12/2009 | Safavi | ........................... 455/126 |
| 2011/0135036 | A1* | 6/2011 | Andgart et al. | ............... 375/316 |
| 2012/0213096 | A1* | 8/2012 | Krishnamurthy et al. | ..... 370/252 |
| 2013/0077716 | A1* | 3/2013 | Soler Garrido | ............... 375/316 |
| 2013/0128807 | A1* | 5/2013 | Vermani et al. | ............... 370/328 |
| 2013/0238262 | A1* | 9/2013 | Asami | ............................. 702/58 |
| 2013/0259153 | A1* | 10/2013 | Varanese et al. | ............. 375/295 |

* cited by examiner

*Primary Examiner* — Hirdepal Singh

(74) *Attorney, Agent, or Firm* — Sterne, Kessler, Goldstein & Fox P.L.L.C.

(57) ABSTRACT

The present disclosure is described in the exemplary context of a Long Term Evolution (LTE) cellular network and is directed to a method and apparatus for estimating a gain and phase imbalance between an in-phase path and a quadrature path of a receiver operating in such a network. The method and apparatus specifically exploit channel coherence in time and frequency, and the properties of the Primary Synchronization Signal (PSS), and/or the Secondary Synchronization Signal (SSS), and/or information in the Physical Broadcast Channel (PBCH), all of which are defined by the LTE standard, to estimate the gain and phase imbalance of the receiver while it remains connected to a base station to receive data.

20 Claims, 6 Drawing Sheets

IQ IMBALANCE ESTIMATION USING BROADCAST SIGNALS

TECHNICAL FIELD

This application relates generally to in-phase and quadrature (IQ) imbalance estimation.

BACKGROUND

A direct-conversion, IQ receiver typically uses two mixers and two filters to down-convert a received signal into an in-phase component and a quadrature component. A first mixer mixes the received signal and an in-phase local oscillator signal to produce a first down-converted signal. The first down-converted signal is then processed by a first low-pass filter to remove unwanted high-frequency portions, leaving the desired in-phase component. A second mixer mixes the received signal and a quadrature-phase local oscillator signal to produce a second down-converted signal. The second down-converted signal is then processed by a second low-pass filter to remove unwanted high-frequency portions, leaving the desired quadrature component.

Under ideal conditions, the first mixer and the first low pass filter (collectively referred to as the in-phase path) supply an equal amount of gain and a difference in phase of 90 degrees to the in-phase component as the second mixer and second low pass filter (collectively referred to as the quadrature path) does to the quadrature component. In actual practice, factors such as manufacturing process non-idealities, temperature, and supply voltage cause a gain and phase imbalance between these two paths. These imbalances in a multicarrier communication system result in inter-carrier interference in the frequency-domain between each subcarrier of the received signal and its image, which degrades the performance of the receiver.

Therefore, the gain and phase imbalance between the in-phase path and the quadrature path are typically calibrated, i.e., estimated and compensated for, before the receiver begins receiving data (e.g., at power up). However, further gain and phase imbalances between the in-phase path and the quadrature path can occur after the receiver begins to receive data due to intentional or unintentional changes in the receiver. The conventional approach to dealing with these further gain and phase imbalances is to reset the receiver and re-perform the estimation and compensation process. Although effective in calibrating the paths, such an approach reduces the potential throughput of the receiver.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. OVERVIEW

The present disclosure is described below in the context of a Long Term Evolution (LTE) cellular network and is directed to a method and apparatus for estimating a gain and phase imbalance between an in-phase path and a quadrature path of a receiver operating in such a network. The method and apparatus specifically exploit the properties of the Primary Synchronization Signal (PSS), and/or the Secondary Synchronization Signal (SSS), and/or information in the Physical Broadcast Channel (PBCH), all of which are defined by the LTE standard, to estimate the gain and phase imbalance of the receiver while it remains connected to a base station to receive data. These and other features of the method and apparatus are described further below.

II. APPARATUS AND METHOD FOR IQ IMBALANCE ESTIMATION

Figure 1:
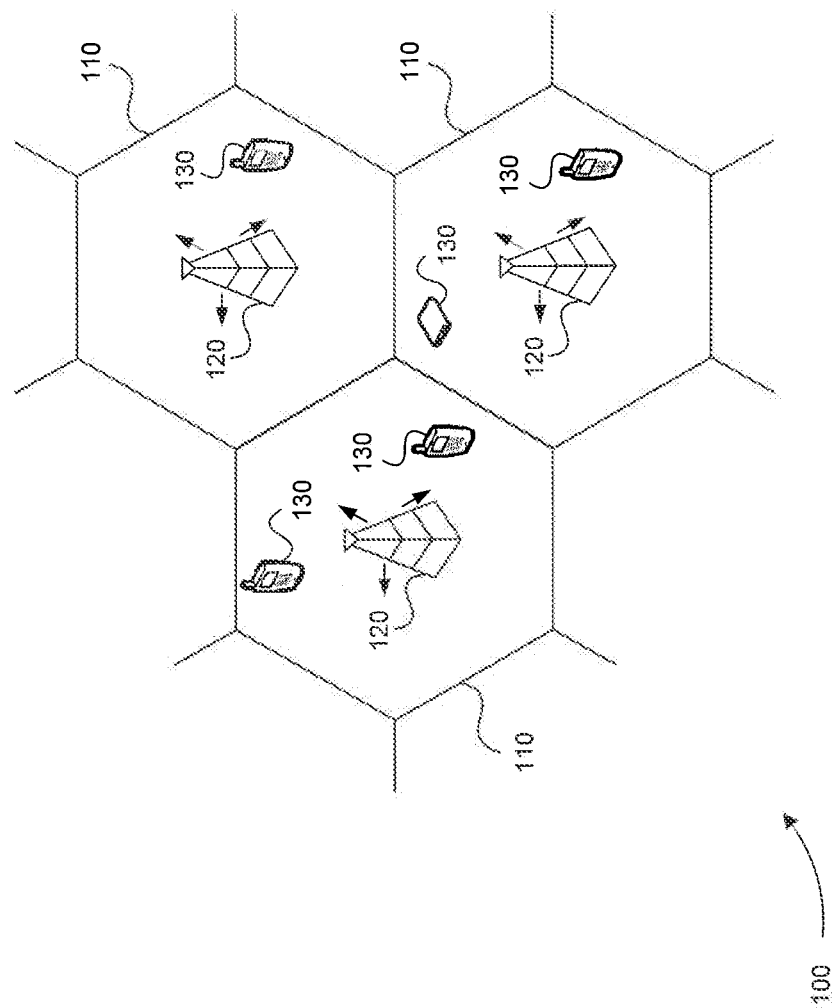
FIG. 1 illustrates an exemplary Long Term Evolution (LTE) cellular network in which embodiments of the present disclosure can be implemented.

Referring now to FIG. 1, an exemplary LTE cellular network 100 in which embodiments of the present disclosure can be implemented is illustrated. LTE cellular network 100 is distributed over land areas 110, referred to as cells, that are each served, by a respective base station 120. Cells 110 are geographically joined together to enable LTE terminals 130 (e.g., mobile phones, laptops, tablets, pagers, etc.) to wirelessly communicate over a wide area with a core network (not shown) via base stations 120.

Before an LTE terminal can connect to and exchange data with a base station over an LTE cellular network, such as LTE cellular network 100 in FIG. 1, an LTE terminal needs to perform a cell search to acquire frequency and symbol synchronization to a cell and detect the physical-layer identity of the cell. Two synchronization signals—the Primary Synchronization Signal (PSS) and the Secondary Synchronization Signal (SSS)—are broadcast from base stations in the LTE cellular network to assist in the cell search. The time domain position of these two signals within an LTE frame is generally constant from frame-to-frame to support synchronization.

Figure 2:
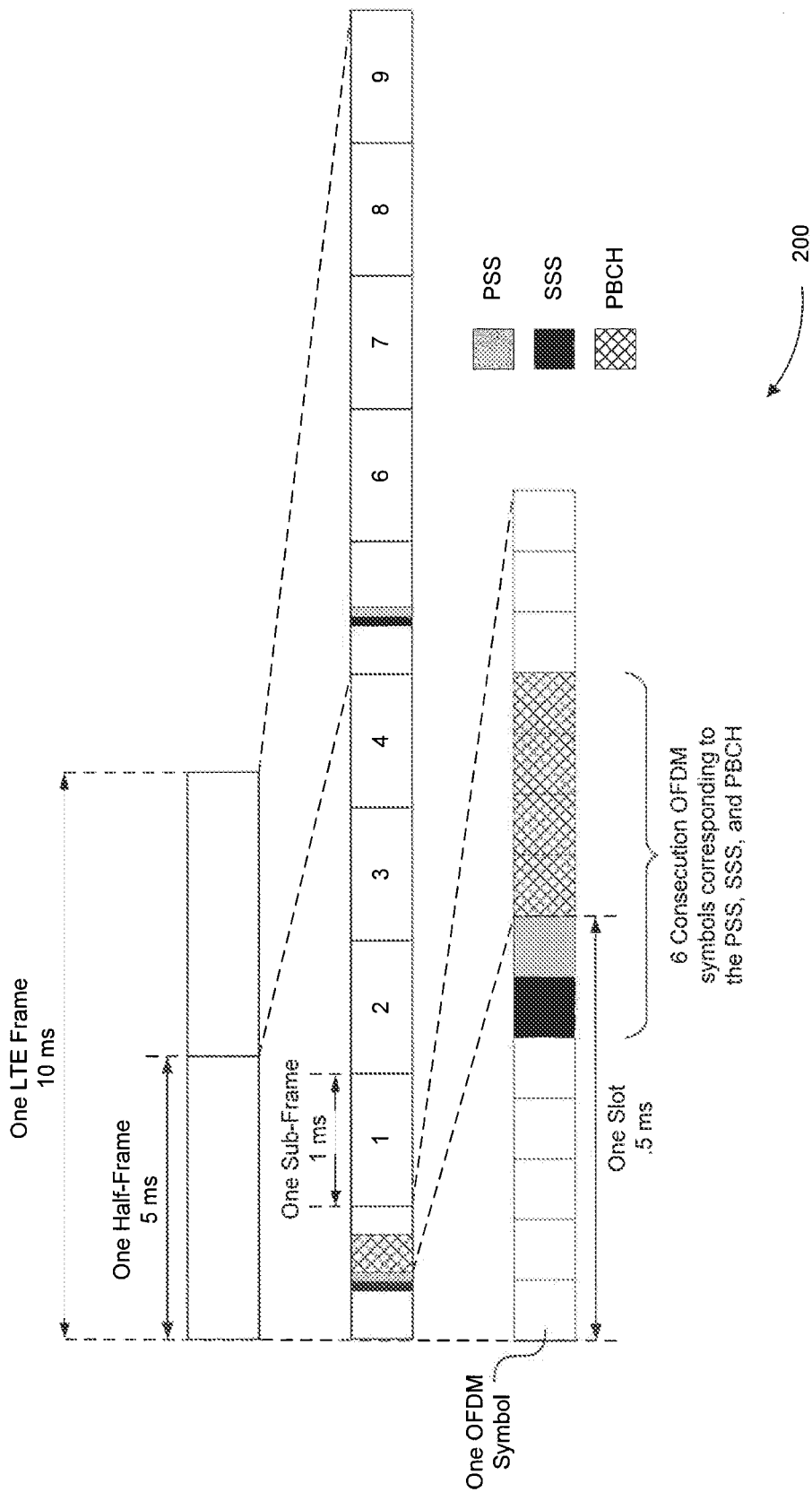
FIG. 2 illustrates the general LTE frame configuration.

FIG. 2 illustrates the general LTE frame configuration 200. As shown, the general LTE frame configuration 200 is ten milliseconds in duration and includes two, five millisecond half-frames. Each half-frame is divided into five sub-frames (0-4 and 5-9) that are one millisecond in duration. The sub frames each typically carry 14 orthogonal frequency division multiplexing (OFDM) symbols, which are divided among two, half millisecond slots of the subframes as further shown in FIG. 2.

In an LTE cellular network operating in a frequency division duplexing mode, the PSS is transmitted in the last OFDM symbol of the first slot in sub-frames 0 and 5, and the SSS is typically transmitted in the second to last OFDM symbol right before the PSS in the same sub-frame slots. This mapping is shown in FIG. 2. Additionally, although not shown in FIG. 2, it is important to note that, in the frequency domain, the PSS and SSS are transmitted over the central 72 sub-carriers centered around the DC sub-carrier of each of the OFDM symbols in which they are transmitted.

After an LTE terminal establishes synchronization with a cell using the PSS and SSS, the LTE terminal further demodulates and decodes system information that is periodically broadcast by the base station over the Physical Broadcast Channel (PBCH). This system information is further used by the LTE terminal to connect to and exchange data with the base station. The PBCH is mapped to the central 72 sub-carriers centered around the DC sub-carrier of the four OFDM symbols immediately following the OFDM symbol carrying the PSS in sub-frame 0 as further shown in FIG. 2.

For a given cell, the sequence carried by the PSS typically remains constant in every sub-frame it is transmitted, while the sequence carried by the SSS in each LTE frame changes but in a specific manner known to an LTE terminal. The system information carried by the PBCH further typically remains constant from frame-to-frame, but in the event that the system information does change, the LTE terminal will be informed of the change and can subsequently learn the new system information.

The apparatus and method of the present disclosure can be implemented in a receiver of an LTE terminal to exploit, after the LTE terminal has established a connection to a base station, the known sequences of the PSS and SSS and the known system information carried by the PBCH. In particular, the apparatus and method of the present disclosure can exploit one or more of the 6 consecutive OFDM symbols shown in FIG. 2 that correspond to these signals and use them as pseudo pilot signals to estimate a gain and phase imbalance between an in-phase path and a quadrature path of the receiver of the LTE terminal. The estimation can occur while the LTE terminal remains connected to the base station to receive data.

Figure 3:
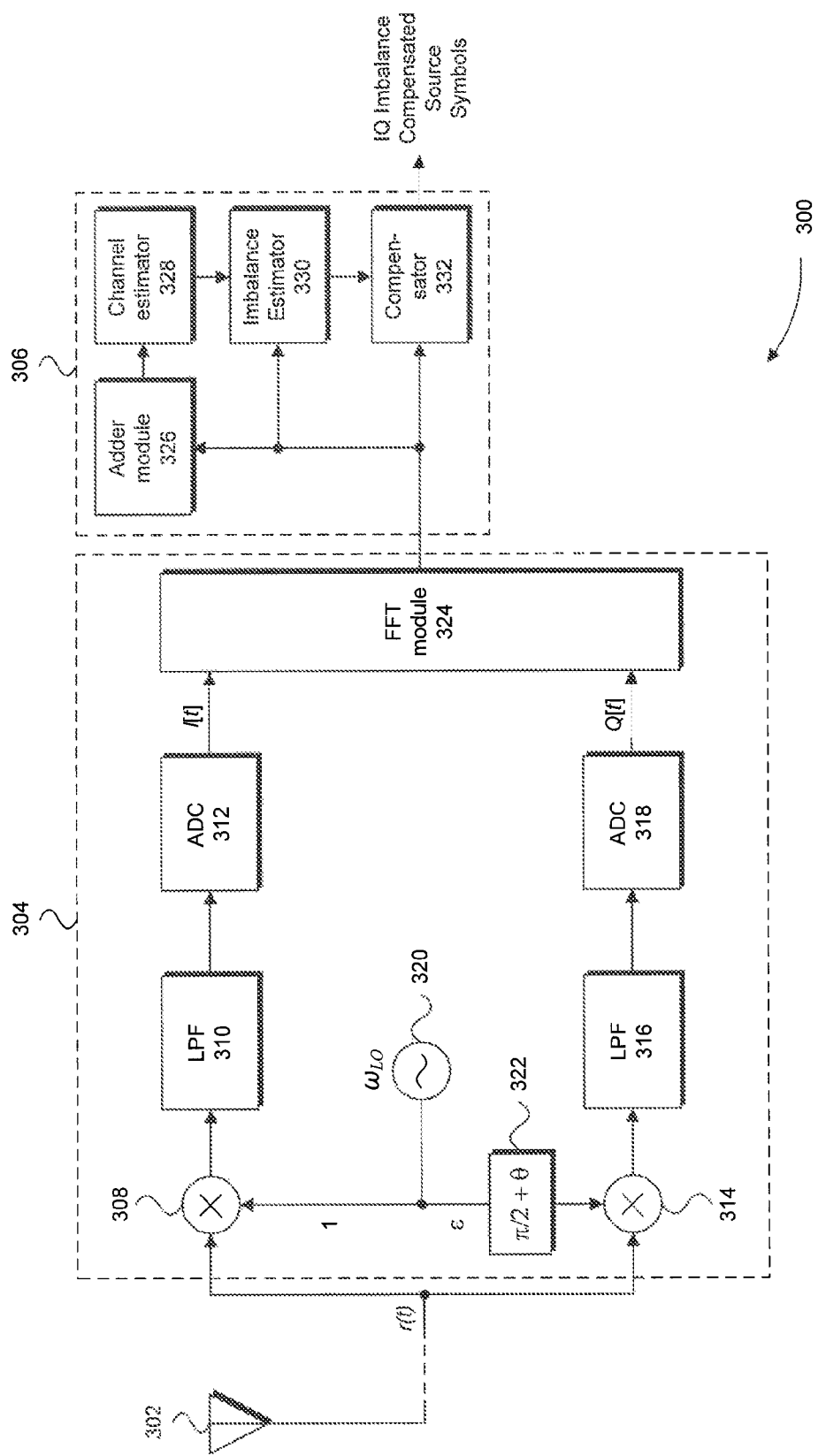
FIG. 3 illustrates a simplified block diagram of an example LTE receiver in accordance with embodiments of the present disclosure.

Referring now to FIG. 3, a simplified block diagram of an example LTE receiver 300 is illustrated in accordance with embodiments of the present disclosure. LTE receiver 300 includes an antenna 302, a down-converter 304, and an apparatus 306 configured to estimate a gain and phase imbalance between an in-phase path and a quadrature path of LTE receiver 300 as discussed above. LTE receiver 300 can be implemented, for example, in one of LTE terminals 130 shown in FIG. 1.

In operation, antenna 302 receives a signal r(t) from a base station in an LTE cellular network. The signal r(t) includes frames that are configured as shown in FIG. 2 and is first processed by, for example, a band-pass filter and a low-noise amplifier (both of which are not shown) and then provided to down-converter 304 for down-conversion. Down-converter 304 includes two paths: an in-phase path and a quadrature path. The in-phase path includes a mixer 308, a low-pass filter 310, and an analog-to-digital converter 312. The quadrature phase path includes a mixer 314, a low-pass filter 316, and an analog-to-digital converter 318. Mixer 308 of the in-phase path mixes the signal r(t) with an in-phase local oscillator signal provided by a local oscillator 320 and provides the mixed signal as a first down-converted signal at its output. Mixer 314 of the quadrature path mixes the signal r(t) with a quadrature-phase local oscillator signal provided by a phase shifter 322 and provides the mixed signal as a second down-converted signal at its output. Phase shifter 322 produces the quadrature-phase local oscillator signal by phase shifting the in-phase local oscillator signal provided by local oscillator 320 by ideally 90 degrees (or $\pi/2$ radians).

After being provided by mixers 308 and 314, the two down-converted signals are respectively filtered by low-pass filters 310 and 316 to remove unwanted high-frequency portions and, thereafter, digitized by analog-to-digital converters 312 and 318. At the output of analog-to-digital converter 312, a digital in-phase component signal I[t] is provided, and at the output of analog-to-digital converter 318, a digital quadrature component signal Q[t] is provided. Together, groups of corresponding samples of the digital in-phase component signal I[t] and the digital quadrature component signal Q[t] represent the time-domain samples of OFDM symbols received over signal r(t). Each such group is processed by a fast Fourier transform module 324 to transform the OFDM symbol into the frequency domain to recover the complex source symbols transmitted over its sub-carriers. Although fast Fourier transform module 324 is shown in FIG. 3 as having a single output, this single output can represent a parallel bus for providing the sub-carriers that makeup each OFDM symbol.

Under ideal conditions, no gain or phase imbalance exists between the in-phase branch and the quadrature branch of down-converter 304. In actual practice, factors such as manufacturing process non-idealities, temperature, and supply voltage cause a gain and/or phase imbalance between these two paths. The gain and phase imbalance can be modeled in the quadrature local oscillator signal provided as output by phase shifter 322 as follows:

$$LO_Q = \epsilon \sin(\omega_{LO} t + \theta) \quad (1)$$

where $\epsilon$ represents the gain imbalance and $\theta$ represents the phase imbalance. When no gain or phase imbalance exists between the in-phase branch and the quadrature branch of down-converter 304, $\epsilon$ and $\theta$ are equal to 1 and 0 radians, respectively. Any other values for $\epsilon$ and $\theta$ represents an imbalance between the two branches that results in inter-carrier interference in the frequency-domain between each subcarrier of the received OFDM symbols and its image, which degrades the ability of LTE receiver 300 to properly decode the complex source symbols transmitted over each sub-carrier and output by fast Fourier transform module 324.

Apparatus 306 is configured to estimate and compensate for any gain and phase imbalance between the in-phase path and quadrature path of down-converter 304 to reduce such interference. Apparatus 306 includes an adder module 326, a channel estimator 328, an imbalance estimator 330, and a compensator 332 and is configured to exploit the known sequences of the PSS and/or SSS and/or the known system information carried by the PBCH. In particular, apparatus 306 exploits one or more of the 6 consecutive OFDM symbols shown in FIG. 2 that correspond to these signals and uses them as pseudo pilot signals to estimate a gain and phase imbalance between the in-phase path and the quadrature path of down-converter 304. The estimation can occur while the LTE terminal in which LTE receiver 300 is implemented remains connected to a base station to receive data.

As mentioned above, in the frequency domain, the PSS, SSS, and PBCH are mapped to the central 72 sub-carriers centered around the DC sub-carrier of the 6 consecutive OFDM symbols over which they are transmitted. The complex source symbol received by LTE receiver 300 over each of these 72 sub-carriers (or some portion of them) are provided as input to adder module 326 from the output of fast Fourier transform module 324 and can be represented by the following expression:

$$Y_{k,n} = \alpha H_{k,n} + \beta H^*_{-k,n} S^*_{-k,n} + \bar{z}_{k,n},$$

$$n=1,2,\ldots 6 \text{ and } -K/2 \leq k \leq K/2 \quad (2)$$

where [•]* denotes complex conjugate, k is a sub-carrier index, n is an OFDM symbol index, $S_{k,n}$ denotes the known complex source symbol that was transmitted, $H_{k,n}$ denotes the channel over which the known complex source symbol $S_{k,n}$ was transmitted, and $\bar{z}_{k,n}$ denotes complex circularly-symmetric additive white Gaussian noise received on the $k^{th}$ sub-carrier of the $n^{th}$ OFDM symbol. Furthermore, K denotes the number of subcarriers processed and is less than or equal to 72, and α and β are imbalance parameters given by:

$$\alpha = \frac{1+\varepsilon \exp(j\theta)}{2}, \beta = 1-\alpha^* \quad (3)$$

where ε represents the gain imbalance and θ represents the phase imbalance as noted above.

The parameter of interest in Equation (2) is either one of the two complex imbalance parameters α and β. To estimate or solve for either of these two imbalance parameter, apparatus 306 needs to first estimate or solve for the unknown channel $H_{k,n}$, as the transmitted complex source symbol $S_{k,n}$ is already known. The PSS, SSS, and PBCH are transmitted from different antenna ports, i.e., using different beamformers, by the base station than the Physical Downlink Shared Channel (PDSCH), which is the main data-bearing channel in LTE. Because the channel corresponding to the PDSCH as seen by LTE receiver 300 is different from the channel over which the PSS, SSS, and PBCH are broadcast, any estimate of the channel corresponding to the PDSCH available to the LTE receiver 300 may not be reliably used as an estimate for the channel over which the PSS, SSS, and PBCH are broadcast.

Therefore, apparatus 306 estimates the channel $H_{k,n}$ using a different approach. In particular, adder module 326 is first used to form a new statistic for one or more of the received symbols $Y_{k,n}$. The new statistic isolates the unknown channel $H_{k,n}$ from the unknown imbalance parameters α and β so that the unknown channel $H_{k,n}$ can be estimated. The new statistic is formed by adder module 326 by adding $Y_{k,n}$ to $Y_{-k,n}^*$ and is given by:

$$T_{k,n}=Y_{k,n}+Y_{-k,n}^*=H_{k,n}S_{k,n}+H_{-k,n}^*S_{-k,n}^*+\bar{z}_{k,n},$$

$$n=1,2,\ldots 6 \text{ and } 1 \leq k \leq K/2 \quad (4)$$

In words, the statistic $T_{k,n}$ is formed by adding a first symbol $Y_{k,n}$ received over a first subcarrier k with a complex conjugate of a second symbol $Y_{-k,n}$ received over a second subcarrier −k. The first and second subcarriers are located at equal distances from the DC subcarrier and on opposite sides of the DC subcarrier and can be referred to as a sub-carrier pair. As can be seen from Equation (4), the new statistic $T_{k,n}$ is independent of the unknown imbalance parameters α and β.

Figure 4:
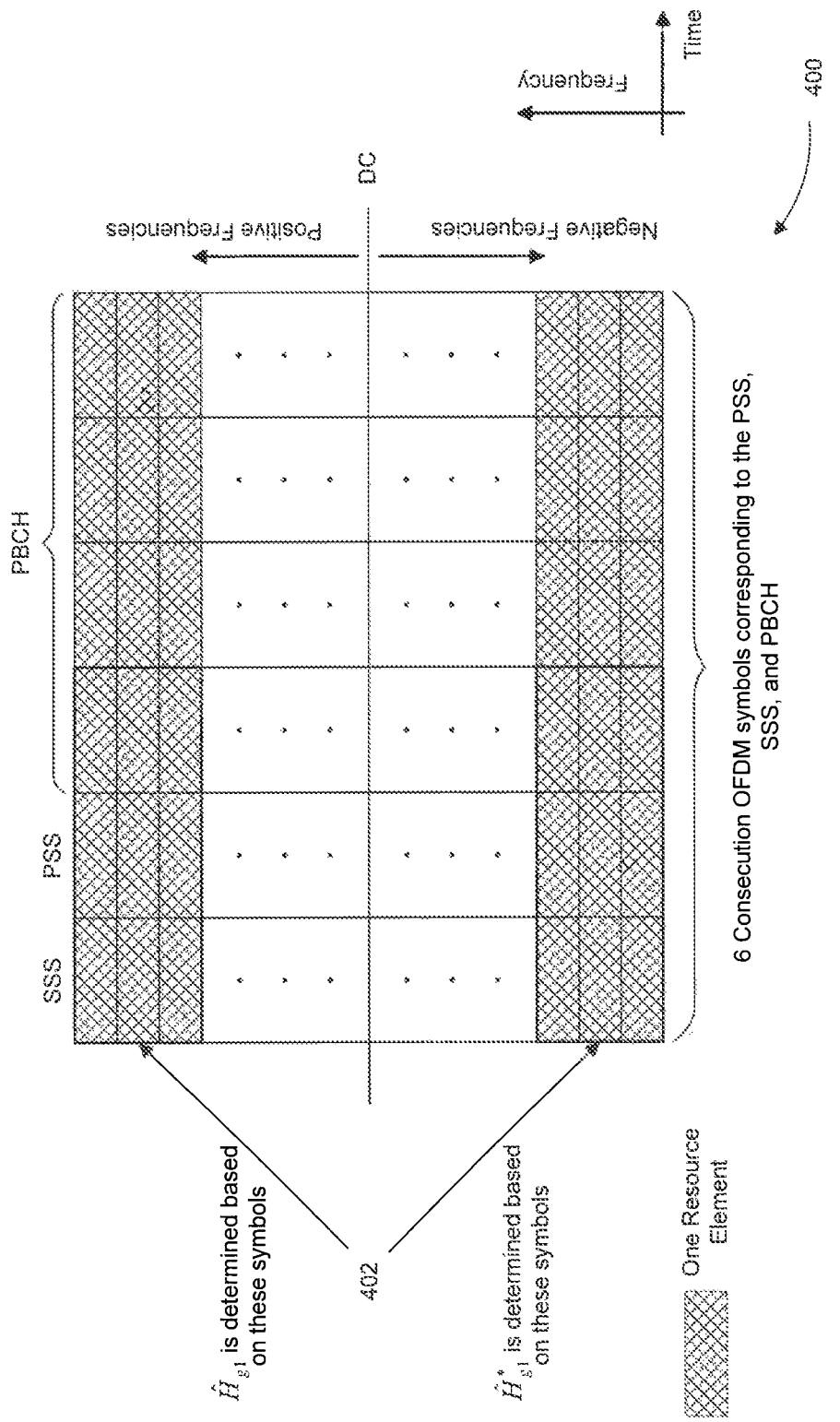
FIG. 4 illustrates an exemplary grouping of complex source symbols in accordance with embodiments of the present disclosure.

After adder module 326 forms the new statistics $\{T_{k,n}\}$, they are provided to channel estimator 328. To estimate the channel over all subcarriers using $\{T_{k,n}\}$, channel estimator 328 can exploit the coherence time and coherence bandwidth of the channel and consider the channel fixed over $C_{g,F}$ adjacent subcarriers and over $C_{g,T}$ consecutive OFDM symbols. The number of divisions in the frequency and time dimensions can be denoted by $G_F$ and $G_T$, respectively. With this coherence assumption, channel estimator 328 can divide $\{T_{k,n}\}$ into $G_T G_F$ groups and respectively stack the members of each group into one column as follows:

$$x_g = \begin{bmatrix} T_{k_1^g, n_1^g} \\ T_{k_2^g, n_1^g} \\ \vdots \\ T_{k_{C_{g,F}}, n_{C_{g,T}}} \end{bmatrix} \quad (5)$$

$$= \underbrace{\begin{bmatrix} S_{k_1^g, n_1^g} & S_{-k_1^g, n_1^g} \\ S_{k_2^g, n_1^g} & S_{-k_2^g, n_1^g} \\ \vdots & \vdots \\ T_{k_{C_{g,F}}, n_{C_{g,T}}} & T_{k_{C_{g,F}}, n_{C_{g,T}}} \end{bmatrix}}_{=S_g} \begin{bmatrix} H_{g1} \\ H_{g2} \end{bmatrix} + z_g + e_g$$

where g denotes the group index and $k_i^g$ and $n_i^g$ denote the $i^{th}$ subcarrier and symbol indices, respectively, belonging to the $g^{th}$ group. Furthermore, $H_{g1}$ and $H_{g2}^*$ denote the nominal channel values of the positive and negative frequencies, respectively, of the $g^{th}$ group. In other words, $H_{g1}$ and $H_{g2}$ represent $H_{k,n}$ and $H_{k,n}^*$, respectively, in Equation (4). An example group 402, with $G_T=3$ and $G_F=8$, is shown in FIG. 4. FIG. 4 specifically illustrates a grid of resource elements 400 that corresponds to the 6 consecutive OFDM symbols of the PSS, SSS, and PBCH. Each resource element shown in. FIG. 4 corresponds to one OFDM sub-carrier for the duration of one OFDM symbol time and can be used to carry one complex source symbol.

The size of the vector $x_g$ is $C_{g,F}C_{g,T}$, and the vectors $z_g$ and $e_g$ denote the noise and modeling error, respectively. The modeling error comes from the fact that the channel values in the $g^{th}$ group are not exactly the same due to finite coherence time and coherence bandwidth of the channel. As the size of the groups increase, there is more noise averaging but at the same time higher modeling errors. Therefore, in one embodiment, channel estimator 328 can determine the group sizes based on one or more of the signal-to-noise ratios (SNRs) associated with the sub-carriers and/or on the coherence time and/or coherence bandwidth of the channel. For low SNRs, more noise averaging is desirable so channel estimator 328 can use bigger group sizes as compared to higher SNRs. Also, at high SNRs, long noise averaging is not needed so channel estimator 328 can use smaller group sizes (as compared to lower SNRs) for more accurate model.

After channel estimator 328 forms the vector $x_g$, channel estimator 328 can use, for example, the least squares estimation technique to estimate $H_{g1}$ and $H_{g2}$ from the overdeteimined system represented by the vector $x_g$. Assuming the least squares estimation technique is used, channel estimator 328 evaluates the following to estimate $H_{g1}$ and $H_{g2}$:

$$\begin{bmatrix} \hat{H}_{g1} \\ \hat{H}_{g2} \end{bmatrix} = (S_g^H S_g)^{-1} S_g^H x_g \quad (6)$$

where $S_g$ is defined in Equation (5).

After channel estimator 328 obtains the channel estimates $\hat{H}_{g1}$ and $\hat{H}_{g2}$ for each group, imbalance estimator estimates the imbalance parameter a as follows:

$$\hat{\hat{\alpha}} = \frac{\hat{\alpha} + (1-\hat{\beta})}{2}, \text{ with } \begin{bmatrix} \hat{\alpha} \\ \hat{\beta} \end{bmatrix} = (H^H H)^{-1} H^H Y \quad (7)$$

where Y and H are obtained by vertically stacking $\{Y_{k,n}\}$ and $[\hat{H}_{k,n}S_{k,n} \; \hat{H}_{-k,n}*S_{-k,n}*]$, respectively, for n=1, 2, ... 6 and $-K/2 \le k \le K/2$. The channel estimates $\hat{H}_{g1}$ and $\hat{H}_{g2}$ obtained for each group are provided by channel estimator 328 to imbalance estimator 330 and are used to populate $H_{k,n}$ and $H_{-k,n}*$ in Equation (7).

After solving for $\hat{\alpha}$ and/or $\hat{\beta}$, either of these two values can be provided to compensator 332 to compensate for the effects of gain and/or phase imbalance between the two branches in down-converter 304 using simple linear processing techniques as would be appreciated by one of ordinary skill in the art. Compensator 332 specifically uses $\hat{\alpha}$ and/or $\hat{\beta}$ to compensate for the effects of gain and/or phase imbalance on the complex source symbols provided as output by FFT module 324. Alternatively, $\hat{\alpha}$ and $(1-\hat{\beta})$ can be averaged and the resulting value $\hat{\hat{\alpha}}$ can be used by compensator 332 to compensate for the effects of gain and/or phase imbalance between the two branches in down-converter 304 using linear processing techniques as would be appreciated by one of ordinary skill in the art.

In another embodiment, $\hat{\alpha}$ and/or $\hat{\beta}$ and/or $\hat{\hat{\alpha}}$, can be used to adjust modules in down-converter 304 to compensate for any imbalance between the two branches. For example, the complex, time-domain samples of each OFDM symbol can be adjusted, or a variable gain amplifier (not shown) in one of the branches and the phase shifter 322 can be adjusted to respectively compensate for any gain and phase imbalance.

It should be noted that, although apparatus 306 was described above as being implemented in an LTE receiver, apparatus 306 can be implemented in any type of receiver operating in any type network where known signals that have sub-carriers symmetrically spaced around the DC sub-carrier are available as pseudo pilot tones to estimate any gain and/or phase imbalance between an in-phase branch and quadrature branch.

Figure 5:
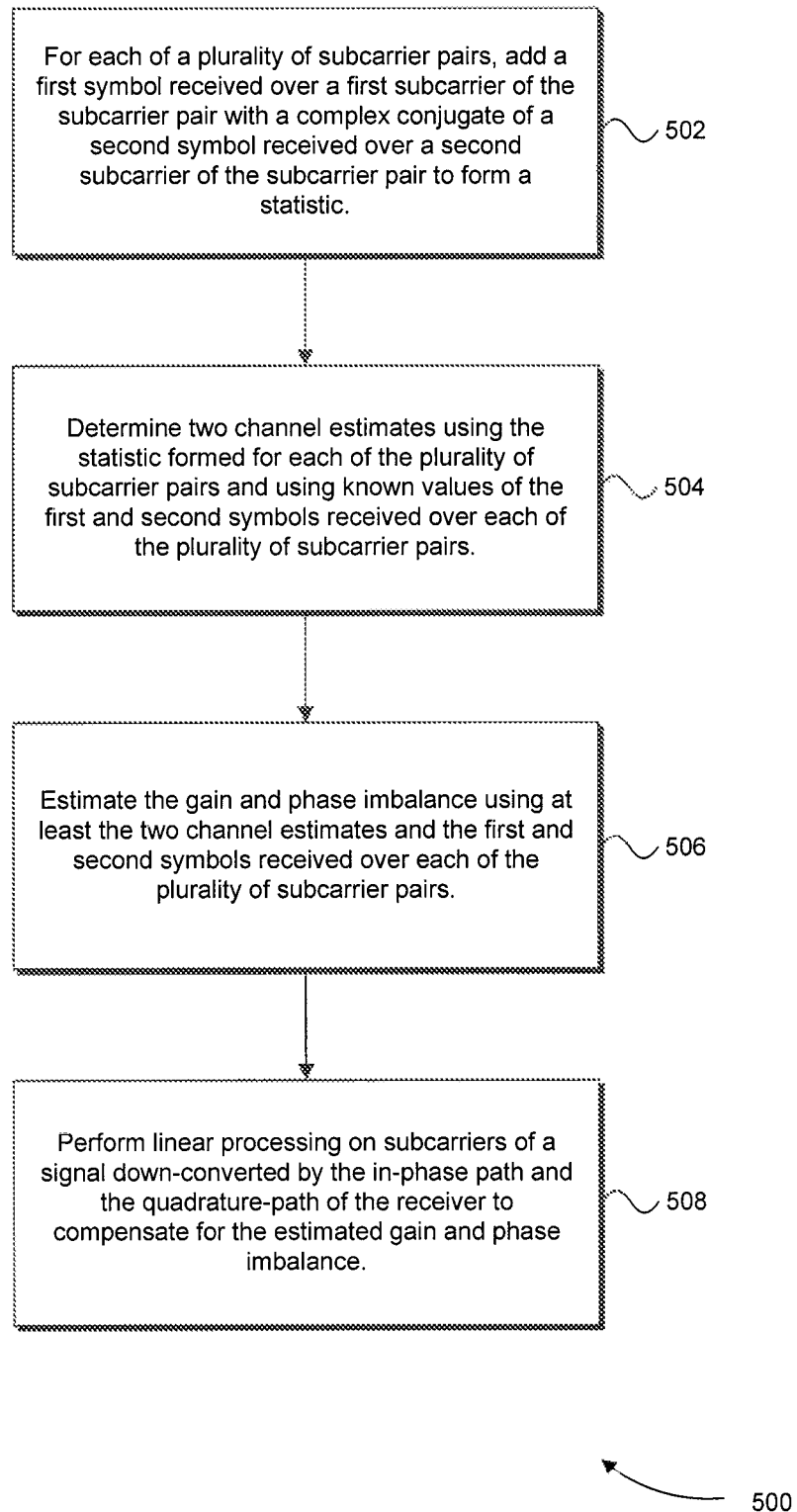
FIG. 5 illustrates a flowchart of an example method for estimating a gain and phase imbalance between an in-phase path and a quadrature path of a receiver in accordance with embodiments of the present disclosure.

Referring now to FIG. 5, a flowchart 500 of an example method for estimating a gain and phase imbalance between an in-phase path and a quadrature path of a receiver is illustrated in accordance with embodiments of the present disclosure. The method of flowchart 500 is described below as being implemented by apparatus 306 of LTE receiver 300 illustrated in FIG. 3. However, it should be noted that the method can be implemented by other apparatuses and receivers as would be appreciated by one of ordinary skill in the art based on the teachings herein.

As shown in FIG. 5, the method of flowchart 500 begins at step 502. At step 502, for each of a plurality of subcarrier pairs in, for example the PSS and/or SSS and/or PBCH symbols, a first symbol received over a first subcarrier of the subcarrier pair is added with a complex conjugate of a second symbol received over a second subcarrier of the subcarrier pair to form a statistic. Equation (4) above can be used for this purpose.

At step 504, two channel estimates are then determined using the statistic formed for each of the plurality of subcarrier pairs and using known values of the first and second symbols received over each of the plurality of subcarrier pairs. For example, Equation (6) above can be solved for using the least squares estimation technique to determine the two channel estimates. The channel estimates correspond to estimates of the channels over which the first and second symbols are received.

At step 506, the gain and phase imbalance are estimated using at least the two channel estimates and the first and second symbols received over each of the plurality of subcarrier pairs. In this step, Equation (7) above can be used to solve for the gain and phase imbalance.

Finally, at step 508, linear processing on subcarriers of a signal down-converted by the in-phase path and the quadrature-path of the receiver can be performed to compensate for the estimated gain and phase imbalance, which were determined at step 506.

III. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
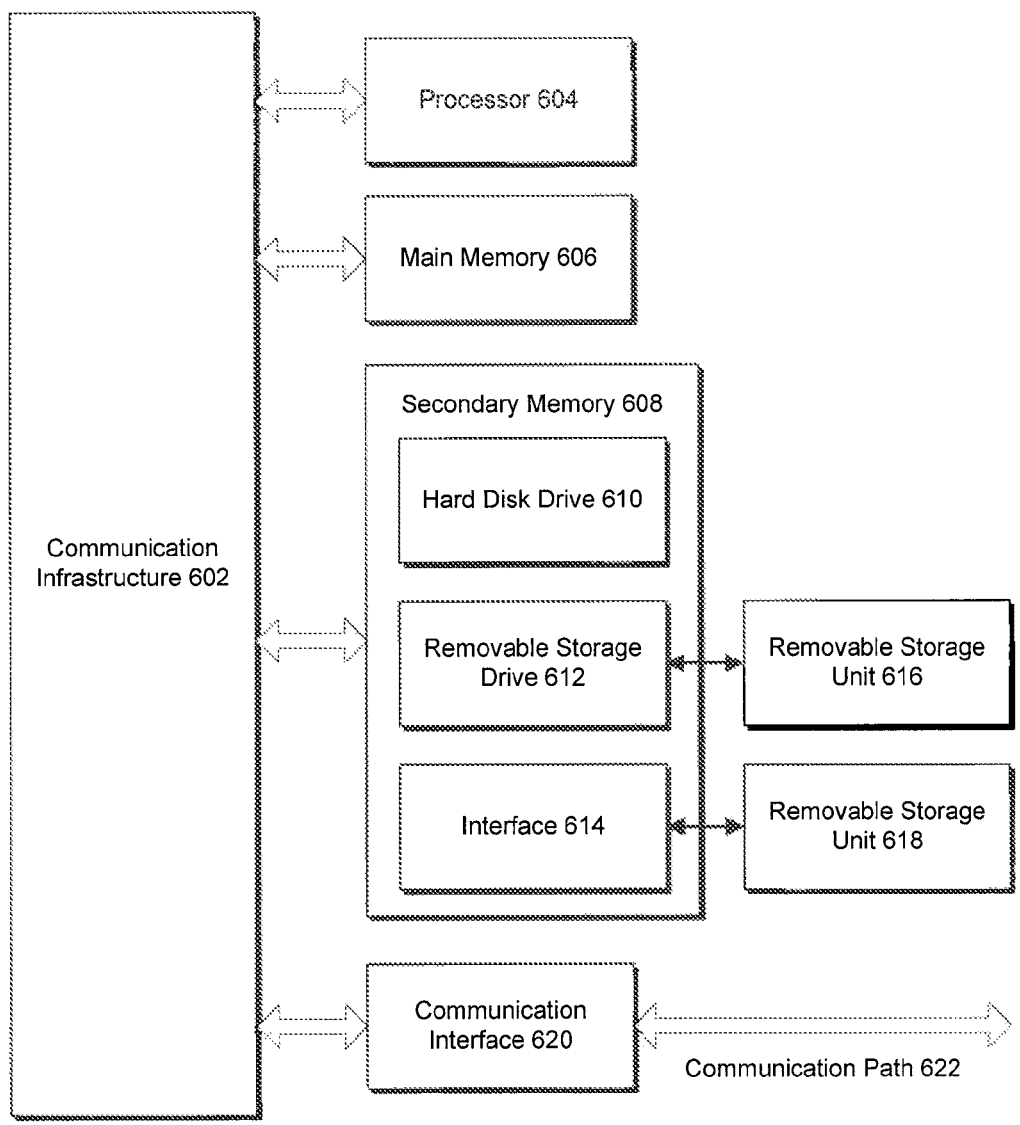
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Modules depicted in FIG. 3 may execute on one or more computer systems 600. Furthermore, each of the steps of the method depicted in FIG. 5 can be implemented on one or more computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 720. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and ranae of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments.

What is claimed is:

1. A method for estimating a gain and phase imbalance between an in-phase path and a quadrature-phase path of a receiver, the method comprising:
   for each of a plurality of subcarrier pairs, adding a first symbol received over a first subcarrier of the subcarrier pair with a complex conjugate of a second symbol received over a second subcarrier of the subcarrier pair to form a statistic, wherein the number of subcarrier pairs in the plurality of subcarrier pairs is determined based on one or more signal-to-noise ratios associated with the plurality of subcarrier pairs;
   determining two channel estimates using the statistics formed for the plurality of subcarrier pairs and using known values of the first and second symbols received over each of the plurality of subcarrier pairs; and
   estimating the gain and phase imbalance using at least the two channel estimates and the first and second symbols received over each of the plurality of subcarrier pairs.

2. The method of claim 1, wherein the first and second subcarriers of each of the plurality of subcarrier pairs are located at equal distances from a direct current (DC) subcarrier and on opposite sides of the DC subcarrier.

3. The method of claim 1, wherein the number of subcarrier pairs in the plurality of subcarrier pairs is determined based on a coherence bandwidth associated with channels over which the plurality of subcarrier pairs are received.

4. The method of claim 1, wherein a difference in time between when the first and second symbols of a first one of the plurality of subcarrier pairs are received and when the first and second symbols of a second one of the plurality of subcarrier pairs are received is constrained based on one or more signal-to-noise ratios associated with the plurality of subcarrier pairs.

5. The method of claim 1, wherein a difference in time between when the first and second symbols of a first one of the plurality of subcarrier pairs are received and when the first and second symbols of a second one of the plurality of subcarrier pairs are received is constrained based on one or more coherence times associated with channels over which the plurality of subcarrier pairs are received.

6. The method of claim 1, wherein the first and second symbols received over one or more of the plurality of subcarrier pairs are associated with a primary synchronization signal, a secondary synchronization signal, or a physical broadcast channel.

7. The method of claim 1, further comprising:
using linear processing on subcarriers of a signal down-converted by the in-phase path and the quadrature-path of the receiver to compensate for the estimated gain and phase imbalance.

8. The method of claim 1, wherein the determining the two channels using the statistics further comprises:
using an overdetermined system of the statistics.

9. A method for determining an imbalance parameter for an in-phase path and a quadrature-phase path of a receiver, the method comprising:
for each of a plurality of subcarrier pairs, adding a first symbol received over a first subcarrier of the subcarrier pair with a complex conjugate of a second symbol received over a second subcarrier of the subcarrier pair to form a statistic, wherein the number of subcarrier pairs in the plurality of subcarrier pairs is determined based on signal-to-noise ratios associated with the plurality of subcarrier pairs;
solving for channel estimates using the statistics formed for the plurality of subcarrier pairs and using known values of the first and second symbols received over each of the plurality of subcarrier pairs; and
solving for an imbalance parameter using the channel estimates and the first and second symbols received over each of the plurality of subcarrier pairs,
wherein the first and second subcarriers of each of the plurality of subcarrier pairs are located at equal distances from a direct current (DC) subcarrier and on opposite sides of the DC subcarrier.

10. The method of claim 9, wherein the number of subcarrier pairs in the plurality of subcarrier pairs is determined based on a coherence bandwidth associated with channels over which the plurality of subcarrier pairs are received.

11. The method of claim 9, wherein a difference in time between when the first and second symbols of a first one of the plurality of subcarrier pairs are received and when the first and second symbols of a second one of the plurality of subcarrier pairs are received is constrained based on one or more signal-to-noise ratios associated with the plurality of subcarrier pairs.

12. The method of claim 9, wherein a difference in time between when the first and second symbols of a first one of the plurality of subcarrier pairs are received and when the first and second symbols of a second one of the plurality of subcarrier pairs are received is constrained based on one or more coherence times associated with channels over which the plurality of subcarrier pairs are received.

13. The method of claim 9, wherein the first and second symbols received over one or more of the plurality of subcarrier pairs are associated with a primary synchronization signal, a secondary synchronization signal, or a physical broadcast channel.

14. The method of claim 9, further comprising:
using linear processing on subcarriers of a signal down-converted by the in-phase path and the quadrature-path of the receiver to compensate for the estimated gain and phase imbalance.

15. An apparatus comprising:
an adder module configured to add, for each of a plurality of subcarrier pairs, a first symbol received over a first subcarrier of the subcarrier pair with a complex conjugate of a second symbol received over a second subcarrier of the subcarrier pair to form a statistic, wherein the number of subcarrier pairs in the plurality of subcarrier pairs is determined based on signal-to-noise ratios associated with the plurality of subcarrier pairs;
a channel estimator configured to estimate channels using the statistics formed for the plurality of subcarrier pairs and known values of the first and second symbols received over each of the plurality of subcarrier pairs; and
an imbalance estimator configured to estimate a gain and phase imbalance using the channel estimates and the first and second symbols received over each of the plurality of subcarrier pairs.

16. The apparatus of claim 15, wherein the first and second subcarriers of each of the plurality of subcarrier pairs are located at equal distances from a direct current (DC) subcarrier and on opposite sides of the DC subcarrier.

17. The apparatus of claim 15, wherein the first and second symbols received over one or more of the plurality of subcarrier pairs are associated with a primary synchronization signal, a secondary synchronization signal, or a physical broadcast channel.

18. The apparatus of claim 15, further comprising:
a compensator configured to perform linear processing on subcarriers of a signal down-converted by an in-phase path and a quadrature-path of a receiver to compensate for the estimated gain and phase imbalance.

19. The apparatus of claim 15, wherein the apparatus is implemented in a Long Term Evolution receiver.

20. The apparatus of claim 15, wherein the channel estimator is configured to estimate the channels using an overdetermined system of the statistics.

* * * * *